United States Patent Office 2,861,093
Patented Nov. 18, 1958

2,861,093

REACTION PRODUCTS OF DIALKYL PHOSPHORO-THIOLOTHIONATES AND MUCOHALIC ACIDS

Richard L. McConnell and Joseph B. Dickey, Kingsport, Tenn., assignors to Eastman Kodak Company, Rochester, N. Y., a corporation of New Jersey No Drawing. Application September 24, 1956
Serial No. 611,760

7 Claims. (Cl. 260—461)

This invention relates to new organophosphorus compounds and to a method of preparing said compounds. In a specific aspect, this invention relates to the reaction of dialkyl phosphorothiolothionates with mucohalic acids, and to the resulting reaction products.

Among the objects of this invention is to provide a novel synthesis of organophosphorus compounds, to provide new and useful organophosphorus compounds, to provide a method for producing new organophosphorus compounds from dialkyl phosphorothiolothionates, to provide novel products from the reaction of dialkyl phosphorothiolothionates and mucohalic acids, and to provide novel organophosphorus compounds useful in insecticide compositions. These and other objects will be apparent from the description and claims that follow.

We have found that new and useful organophosphorus compounds can be produced by the novel process which comprises reacting together a dialkyl phosphorothiolothionate with a mucohalic acid. The new compounds produced can be characterized by the following general formula:

$$\begin{array}{c} RO \\ \diagdown \\ RO \end{array} \!\! \begin{array}{c} S \\ \| \\ P\!-\!S\!-\!\overset{\|}{C}\!-\!COOH \\ \| \\ X\!-\!\overset{\|}{C}\!-\!CHO \end{array}$$

where X is selected from the group consisting of bromine and chlorine, and R is a lower alkyl group containing from one to four carbon atoms.

The process of the invention can be advantageously carried out within a temperature range of $-25°$ to $150°$ C. A preferred embodiment of this process can be effected by carrying out the reaction within the 25 to $125°$ C. range. If preferred, inert solvents can be used in the reaction, and such include the normally liquid hydrocarbons such as pentane, heptane, benzene, xylene, toluene and the like; other suitable solvents include the chlorinated hydrocarbons, ethers, esters, and similar solvents. However, in a preferred embodiment, the reaction is effected without the use of solvent media. Normally, advantageous results can be achieved with reaction periods varying from 1 to 8 hours. The following equation is offered as generally illustrative of the mechanism of the process of our invention:

$(RO)_2P(S)SH + HOOCCCl\!=\!CClCHO \longrightarrow$

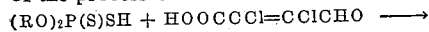
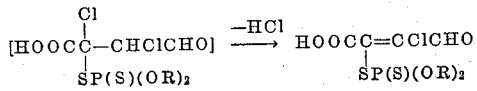

wherein R has the same meaning as given above. It is to be noted that this equation is offered as a suggested mechanism of reaction and is not to be construed as limiting the reaction to this representation. A preferred embodiment of the invention comprises the products derived from dialkyl phosphorothiolothionates containing from 1 to 4 carbon atoms in each alkyl group, and mucochloric and mucobromic acids.

The compounds of this invention have been found to be extremely effective insecticides. This valuable utilization is illustrated by the following.

Tests against mites and mite eggs were carried out in the following manner. Acetone solutions containing 5% of the candidate compounds were prepared and diluted with water to give solutions containing 1000, 100, and 10 p. p. m. of the candidate compounds for testing. Two heavily infested bean leaves containing both eggs and adult two-spotted mites (*T. bimaculatus*) were carefully dipped in the above solutions and dried in a gentle air stream. The leaves were then placed on damp paper toweling in Petri dishes and observed after twenty-four hours for mortality among the adult mites. The leaves were observed again after seven days to determine the number of eggs killed by the treatment.

It should be noted that tests using acetone-water solutions (containing none of the toxicant) kill neither mites nor mite eggs. These are the blank runs referred to in the following table.

| Toxicant | Concentration, p. p. m. | Kill Mites, Percent | Kill Mite Eggs, Percent |
|---|---|---|---|
| 1. Blank | 0 | 0 | 0 |
| 2. Product of Example 1 [$(C_2H_5O)_2P(S)SH+HOOCCCl\!=\!CClCHO$] | 1,000 | 100 | 100 |
|  | 100 | 92 | 49 |
|  | 10 | 81 | 38 |
| 3. Product of Example 2 [$(CH_3O)_2P(S)SH+HOOCCBr\!=\!CBrCHO$] | 1,000 | 100 | 100 |
|  | 100 | 95 | 60 |
|  | 10 | 88 | 51 |

Similar tests were carried out utilizing other compounds of the invention derived from dialkyl phosphorothiolothionates and equally advantageous results were obtained.

In accordance with the above and in furtherance thereof, the following examples are offered as illustrative of certain preferred embodiments of the invention.

*Example 1.—Reaction product of mucochloric acid and O,O-diethyl phosphorothiolothionate*

Mucochloric acid (0.1 mole) and diethyl phosphorothiolothionate (0.1 mole) were mixed and heated carefully with stirring. At $115°$ C., an exothermic reaction took place and HCl was evolved. The heating element was cut off; however, the hot Glas-Col heating mantle was left under the flask until the temperature of the reaction mixture had reached $125°$ C. Then the heating mantle was removed and the heat of reaction maintained the temperature at $120°$ C. for several minutes. The reaction mixture was stirred for one hour and then placed under reduced pressure to remove any volatile impurities. The product is a yellow oil, $n_D^{20}$ 1.5379.

*Example 2.—Reaction product of mucobromic acid and O,O-dimethyl phosphorothiolothionate*

This product was prepared from mucobromic acid (0.1 mole) and dimethyl phosphorothiolothionnate (0.1 mole) according to the procedure of Example 1. This compound is a yellow-orange oil.

*Example 3.—Reaction product of mucobromic acid and O,O-diisopropyl phosphorothiolothionate*

This product is a viscous orange oil and it was prepared from mucobromic acid (0.1 mole) and diisopropyl phosphorothiolothionate (0.1 mole) according to the procedure of Example 1.

*Example 4.—Reaction product of mucochloric acid and O,O-diisobutyl phosphorothiolothionate*

This product is a viscous yellow oil and it was prepared from mucochloric acid (0.1 mole) and diisobutyl phosphorothiolothionate (0.1 mole) according to the procedure of Example 1.

*Example 5.—Reaction product of mucobromic acid and O,O-diethyl phosphorothiolothionate*

This compound was prepared from mucobromic acid (0.1 mole) and diethyl phosphorothiolothionate (0.1 mole) according to the procedure of Example 1.

While the invention has been described in considerable detail with reference to certain preferred embodiments thereof variations and modifications can be effected within the spirit and scope of the invention as described hereinabove and as defined in the appended claims.

We claim:

1. As new compositions of matter, the compounds represented by the general formula:

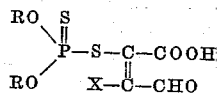

where X is selected from the group consisting of bromine and chlorine, and R is a lower alkyl group containing from one to four carbon atoms.

2. The process which comprises reacting within a temperature range of from 25° to 125° C., a di-lower alkyl phosphorothiolothionate with a compound selected from the group consisting of mucochloric acid and mucobromic acid.

3. The organophosphorus compound of the formula:

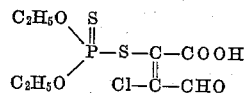

4. The organophosphorus compound of the formula:

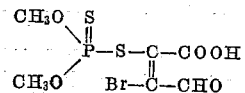

5. The organophosphorus compound of the formula:

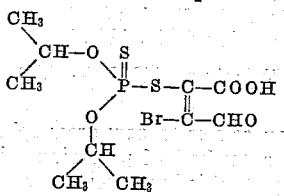

6. The organophosphorus compound of the formula:

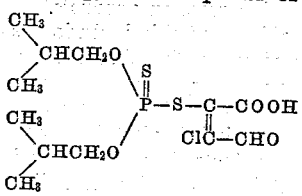

7. The organophosphorus compound of the formula:

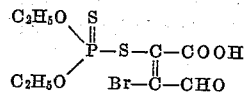

References Cited in the file of this patent
UNITED STATES PATENTS 2,578,652    Cassaday _____ Dec. 18, 1951